(12) United States Patent
Hashimoto et al.

(10) Patent No.: US 11,679,784 B2
(45) Date of Patent: *Jun. 20, 2023

(54) VEHICLE CONTROL DATA GENERATION METHOD, VEHICLE CONTROLLER, VEHICLE CONTROL SYSTEM, VEHICLE LEARNING DEVICE, VEHICLE CONTROL DATA GENERATION DEVICE, AND MEMORY MEDIUM

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

This patent is subject to a terminal disclaimer.

(21) Appl. No.: 16/950,242

(22) Filed: Nov. 17, 2020

(65) Prior Publication Data

US 2021/0213975 A1 Jul. 15, 2021

(30) Foreign Application Priority Data

Jan. 9, 2020 (JP) .............................. JP2020-002030

(51) Int. Cl.
*B60W 60/00* (2020.01)
(52) U.S. Cl.
CPC .............. *B60W 60/0051* (2020.02)
(58) Field of Classification Search
CPC ......... B60W 60/0051; B60W 50/0098; B60W 2050/0088; B60W 2540/10; B60W 10/06; B60R 16/0231
See application file for complete search history.

(56) References Cited

U.S. PATENT DOCUMENTS

| 5,410,477 A | 4/1995 | Ishii et al. |
| 5,532,929 A | 7/1996 | Hattori et al. |

(Continued)

FOREIGN PATENT DOCUMENTS

| CN | 105527963 A | 4/2016 |
| ES | 2 286 958 A1 | 12/2007 |

(Continued)

OTHER PUBLICATIONS

Office Action dated Jul. 26, 2022, in co-pending U.S. Appl. No. 16/948,973.

(Continued)

*Primary Examiner* — Alan D Hutchinson
(74) *Attorney, Agent, or Firm* — Obion, McClelland, Maier & Neustadt, L.L.P.

(57) ABSTRACT

A vehicle control data generation method is provided. A self-driving mode of a vehicle automatically generates a command value of a propelling force produced by a propelling force generator independently of an accelerator operation. An execution device provides a greater reward based on an obtained state of the vehicle when a standard of a characteristic of the vehicle is met than when the standard is not met. Providing the reward changes a reward that is provided when the characteristic of the vehicle is a predetermined characteristic in the self-driving mode such that the changed reward differs from a reward that is provided when the characteristic of the vehicle is the predetermined characteristic in a manual driving mode.

8 Claims, 10 Drawing Sheets

(56) References Cited

U.S. PATENT DOCUMENTS

| | | |
|---|---|---|
| 6,549,815 B1 | 4/2003 | Kaji |
| 6,837,217 B1 | 1/2005 | Hoshino et al. |
| 10,061,316 B2 | 8/2018 | Nishi |
| 10,235,881 B2 | 3/2019 | Nishi |
| 11,125,179 B2 | 9/2021 | Hashimoto et al. |
| 11,313,309 B2 | 4/2022 | Hashimoto et al. |
| 2002/0157639 A1 | 10/2002 | Kidokoro et al. |
| 2003/0055551 A1 | 3/2003 | Weber et al. |
| 2004/0098197 A1 | 5/2004 | Matsumoto et al. |
| 2008/0249667 A1 | 10/2008 | Horvitz et al. |
| 2009/0327011 A1 | 12/2009 | Petroff |
| 2010/0204899 A1 | 8/2010 | Serres |
| 2012/0117011 A1 | 5/2012 | Hashimoto et al. |
| 2014/0018985 A1 | 1/2014 | Gupta et al. |
| 2017/0185087 A1 | 6/2017 | Petroff |
| 2018/0066593 A1 | 3/2018 | Uezono et al. |
| 2018/0072317 A1 | 3/2018 | Hiwatashi et al. |
| 2018/0086349 A1 | 3/2018 | Hiwatashi et al. |
| 2018/0088571 A1 | 3/2018 | Weinstein-Raun |
| 2018/0134118 A1 | 5/2018 | Hintea et al. |
| 2019/0072960 A1 | 3/2019 | Lin et al. |
| 2019/0102668 A1 | 4/2019 | Yao et al. |
| 2019/0113918 A1 | 4/2019 | Englard et al. |
| 2019/0242319 A1 | 8/2019 | Matsumoto et al. |
| 2019/0278282 A1 | 9/2019 | Palanisamy et al. |
| 2019/0360421 A1 | 11/2019 | Cancellieri et al. |
| 2020/0263581 A1 | 8/2020 | Muto et al. |
| 2020/0263618 A1 | 8/2020 | Muto et al. |
| 2021/0033039 A1 | 2/2021 | Hashimoto et al. |
| 2021/0056781 A1 | 2/2021 | Hashimoto et al. |
| 2021/0094587 A1* | 4/2021 | Pilly .............. B60W 60/0051 |
| 2021/0114581 A1 | 4/2021 | Hashimoto et al. |
| 2021/0114596 A1 | 4/2021 | Hashimoto et al. |
| 2021/0114608 A1 | 4/2021 | Hashimoto et al. |
| 2021/0115870 A1 | 4/2021 | Hashimoto et al. |
| 2021/0115871 A1 | 4/2021 | Hashimoto et al. |
| 2021/0188276 A1 | 6/2021 | Hashimoto et al. |
| 2021/0213963 A1 | 7/2021 | Hashimoto et al. |
| 2021/0213966 A1 | 7/2021 | Hashimoto et al. |
| 2021/0213975 A1 | 7/2021 | Hashimoto et al. |

FOREIGN PATENT DOCUMENTS

| | | |
|---|---|---|
| ES | 2016-169686 A | 9/2016 |
| JP | 4-293626 A | 10/1992 |
| JP | 6-248997 A | 9/1994 |
| JP | 10-254505 A | 9/1998 |
| JP | 2000-250604 A | 9/2000 |
| JP | 2002-251599 A | 9/2002 |
| JP | 2003-049703 A | 2/2003 |
| JP | 2004-257434 A | 9/2004 |
| JP | 2009-019523 A | 1/2009 |
| JP | 2009-167968 A | 7/2009 |
| JP | 2016-6327 A | 1/2016 |
| JP | 2019-519851 A | 7/2019 |
| JP | 6547991 B1 | 7/2019 |
| JP | 6547992 B1 | 7/2019 |
| JP | 2019-144748 A | 8/2019 |
| JP | 6590097 B1 | 10/2019 |
| JP | 6997149 B2 | 1/2022 |
| WO | WO 2018/084324 A1 | 5/2018 |
| WO | WO 2018/105703 A1 | 6/2018 |

OTHER PUBLICATIONS

Non-Final Office Action dated Jul. 19, 2021, issued in the U.S. Appl. No. 17/063,203.
Notice of Allowance dated Oct. 19, 2021, issued in the U.S. Appl. No. 17/063,203.
Non-Final Office Action dated Jun. 24, 2021, issued in the U.S. Appl. No. 17/066,862.
Final Office Action dated Dec. 8, 2021, issued in the U.S. Appl. No. 17/066,862.
Notice of Allowance dated Feb. 16, 2022, issued in the U.S. Appl. No. 17/066,862.
Office Action dated Nov. 25, 2022, in co-pending U.S. Appl. No. 17/136,220.
Notice of Allowance dated Nov. 30, 2022, in U.S. Appl. No. 16/948,973.
Corrected Notice of Allowability dated Apr. 6, 2023 in U.S. Appl. No. 17/128,822, 3 pages.
Notice of Allowability dated Mar. 8, 2023, in U.S. Appl. No. 16/948,973, 3 pages.
Corrected Notice of Allowability dated Mar. 20, 2023, in U.S. Appl. No. 16/948,973, 4 pages.

\* cited by examiner

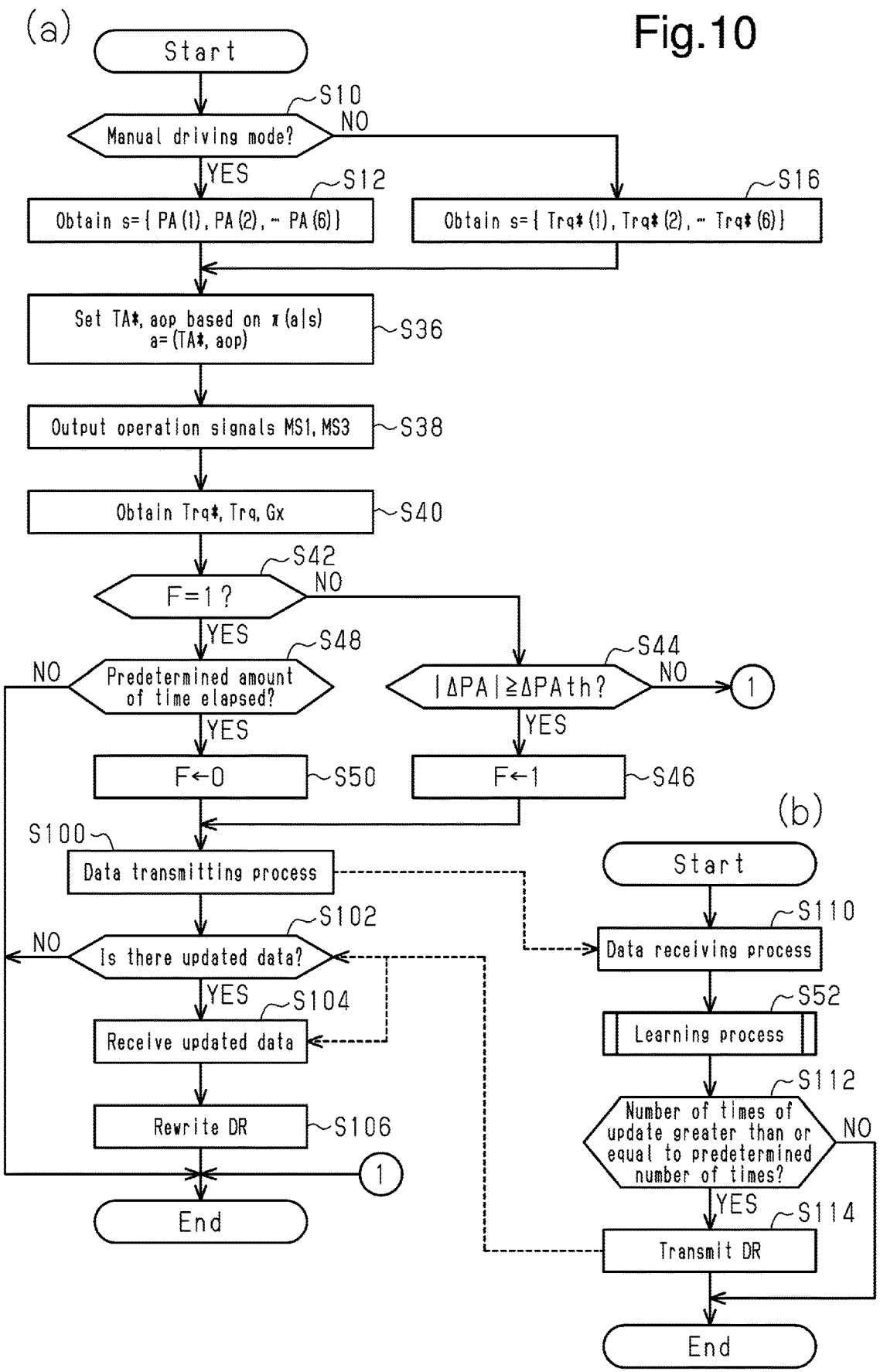

VEHICLE CONTROL DATA GENERATION METHOD, VEHICLE CONTROLLER, VEHICLE CONTROL SYSTEM, VEHICLE LEARNING DEVICE, VEHICLE CONTROL DATA GENERATION DEVICE, AND MEMORY MEDIUM

BACKGROUND

1. Field

The present disclosure relates to a vehicle control data generation method, a vehicle controller, a vehicle control system, and a vehicle learning device.

2. Description of Related Art

For example, Japanese Laid-Open Patent Publication No. 2016-6327 discloses a controller that controls a throttle valve, which is an operated unit of an internal combustion engine mounted on a vehicle, based on a value processing an operation amount of an accelerator pedal with a filter.

The above-described filter is required to be configured to set the operation amount of the throttle valve of the internal combustion engine mounted on the vehicle to an appropriate operation amount in accordance with the operation amount of the accelerator pedal. Thus, adaptation of the filter requires a great number of man-hours by skilled workers.

In this manner, adaptation of operation amounts of electronic devices on a vehicle in accordance with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: A vehicle control data generation method is provided. The generation method is applied to a vehicle that allows for a self-driving mode and a manual driving mode, the self-driving mode automatically generating a command value of a propelling force produced by a propelling force generator independently of an accelerator operation, the manual driving mode generating the command value of the propelling force produced by the propelling force generator in accordance with the accelerator operation. Relationship defining data defines a relationship between a state of the vehicle and an action variable related to an operation of an electronic device in the vehicle. The generation method, with the relationship defining data stored in a memory device, includes: obtaining, by an execution device, the state of the vehicle that is based on a detection value of a sensor; operating, by the execution device, the electronic device; providing, by the execution device, based on the obtained state of the vehicle, a greater reward when a standard of a characteristic of the vehicle is met than when the standard is not met; and updating, by the execution device, the relationship defining data by inputting to a predetermined update map the obtained state of the vehicle, a value of the action variable used to operate the electronic device, and the reward corresponding to the operation of the electronic device. The update map outputs the updated relationship defining data so as to increase an expected return for the reward in a case where the electronic device is operated in accordance with the relationship defining data. The providing the reward includes changing a reward that is provided when the characteristic of the vehicle is a predetermined characteristic in the self-driving mode such that the changed reward differs from the reward that is provided when the characteristic of the vehicle is the predetermined characteristic in the manual driving mode.

In the above-described method, by calculating the reward that results from the operation of the electronic device, it is possible to understand what kind of reward is obtained by the operation. Further, the reward is used to update the relationship defining data with the update map according to reinforcement learning. This sets the relationship between the state of the vehicle and the action variable to be appropriate. Accordingly, the man-hours by skilled workers are reduced when the relationship between the state of the vehicle and the action variable is set to be appropriate.

The self-driving mode and the manual driving mode may differ from each other in the requested element related to the operation of the electronic device. Thus, when a reward is provided in the self-driving mode and the manual driving mode in the same manner, it is difficult to learn through reinforcement learning the suitable relationship defining data that meets the requests unique to the self-driving mode and the manual driving mode. The above-described method uses the changing process to change how to provide a reward between the self-driving mode and the manual driving mode. This makes it possible to learn through reinforcement learning the suitable relationship defining data that meets the requests unique to the self-driving mode and the manual driving mode.

Aspect 2: The vehicle control data generation method according to Aspect 1 is provided. The action variable includes a variable related to an operation of the propelling force generator. The providing the reward includes: a first process that provides a greater reward when a standard related to followability for the command value of the propelling force is met than when the standard is not met; and a second process that provides a greater reward when a standard related to an absolute value of an acceleration of the vehicle in a front-rear direction is met than when the standard is not met. The changing the reward includes changing, so as to be advantageous in obtaining a greater reward when the absolute value of acceleration is smaller in the self-driving mode as compared with the manual driving mode, at least one of the first process or the second process that provide the greater reward.

In the above-described method, when the absolute value of acceleration of the vehicle is small, a greater reward is provided in the self-driving mode than in the manual driving mode. Thus, the relationship defining data enabling the self-driving that prevents the vehicle from suddenly accelerating is learned through reinforcement learning.

Aspect 3: The vehicle control data generation method according to Aspect 1 or 2 is provided. The generation method further includes generating, by the execution device, based on the updated relationship defining data, control mapping data by associating the state of the vehicle with the value of the action variable that maximizes the expected return. The state of the vehicle is input to the control mapping data, which outputs the value of the action variable that maximizes the expected return.

In the above-described method, the control mapping data is generated based on the relationship defining data that has been learned through reinforcement learning. The generated control mapping data is implemented in the controller. This allows the value of the action variable that maximizes the expected return to be easily set based on the state of the vehicle.

Aspect 4: A vehicle controller is provided. The vehicle controller includes the memory device and the execution device in the vehicle control data generation method according to any one of Aspects 1 to 3. The operating the electronic device includes operating, based on the relationship defining data, the electronic device in accordance with the value of the action variable corresponding to the state of the vehicle obtained by obtaining the state of the vehicle.

With the above-described configuration, the value of the action variable is set based on the relationship defining data that has been learned through reinforcement learning, and the electronic device is operated based on the set value of the action variable. This allows the electronic device to be operated such that the expected return increases.

Aspect 5: A vehicle control system includes the execution device and the memory device in the vehicle controller according to Aspect 4 is provided. The execution device includes a first execution device mounted on the vehicle and a second execution device that is an out-of-vehicle device. The first execution device is configured to execute at least the obtaining the state of the vehicle and the operating the electronic device. The second execution device is configured to execute at least the updating the relationship defining data.

With the above-described configuration, the update process is executed by the second execution device. Thus, for example, the computation load on the first execution device is reduced as compared with when the update process is executed by the first execution device.

The phrase "second execution device that is an out-of-vehicle device" means that the second execution device is not an in-vehicle device.

Aspect 6: A vehicle controller is provided that includes the first execution device in the vehicle control system according to Aspect 5.

Aspect 7: A vehicle learning device is provided that includes the second execution device in the vehicle control system according to Aspect 5.

Aspect 8: A vehicle control data generation device is provided that includes the execution device and the memory device that execute various processes according to any one of Aspects 1 to 3.

Aspect 9: A computer readable memory medium is provided that stores a vehicle control data generation process that causes the execution device and the memory device to perform various processes according to any one of Aspects 1 to 3 is provided.

Other features and aspects will be apparent from the following detailed description, the drawings, and the claims.

BRIEF DESCRIPTION OF THE DRAWINGS

FIG. 10 includes sections (a) and (b), which show a procedure of processes executed by the system according to the third embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle control data generation method, a vehicle controller, a vehicle control system, and a vehicle learning device according to each of the embodiments will now be described with reference to the drawings.

First Embodiment

Figure 1:
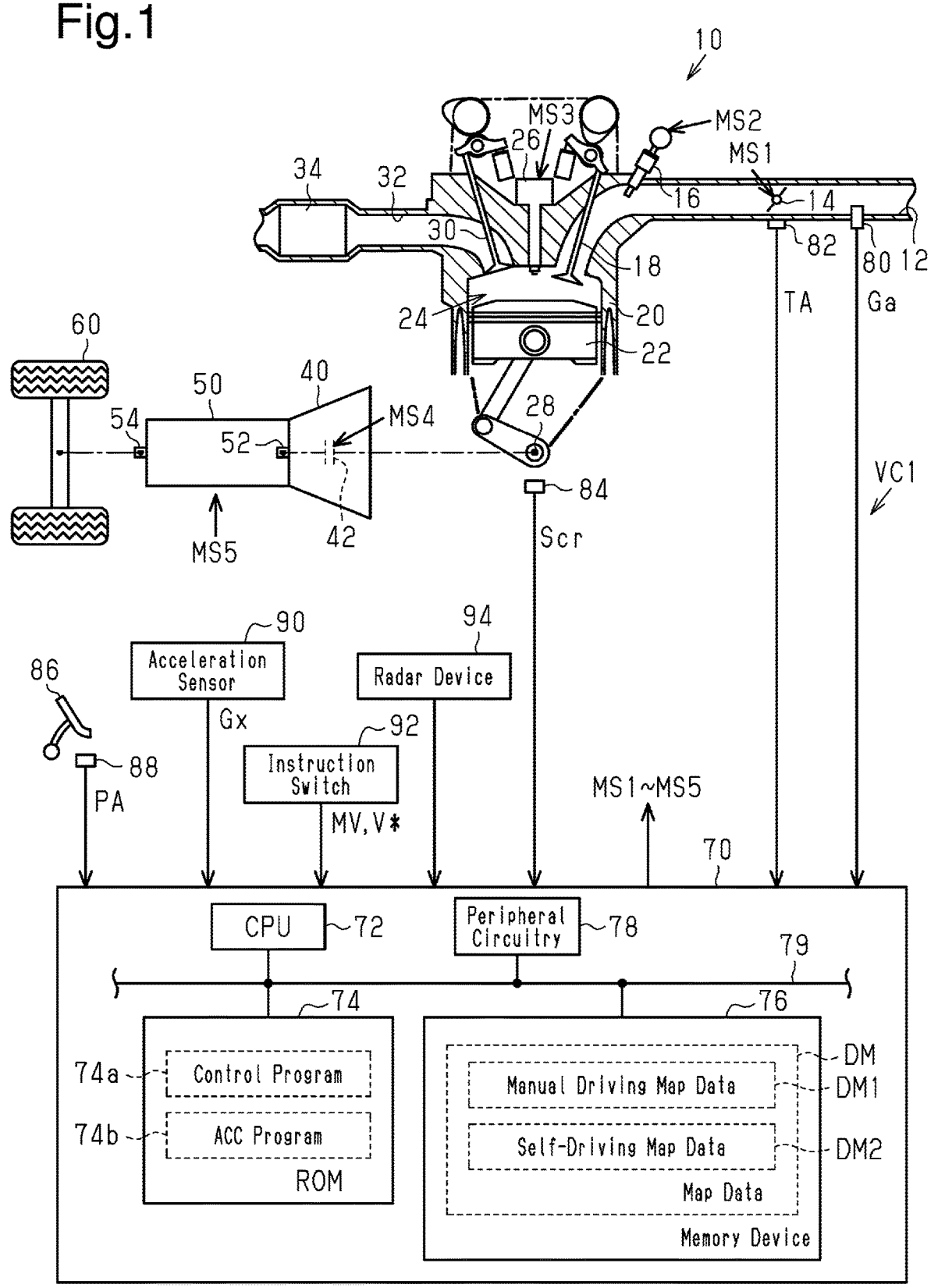
FIG. 1 is a diagram showing a controller and its drive system according to a first embodiment of the present disclosure.

The first embodiment will now be described with reference to FIGS. 1 to 6. FIG. 1 shows the configuration of a drive system of a vehicle VC1 and the controller 70 according to the present embodiment.

As shown in FIG. 1, an internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. In the combustion chamber 24, air-fuel mixture is burned by spark discharge of an ignition device 26. The energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The crankshaft 28 is mechanically couplable to an input shaft 52 of a transmission 50 via a torque converter 40 equipped with a lockup clutch 42. The transmission 50 variably sets the gear ratio, which is the ratio of the rotation speed of the input shaft 52 and the rotation speed of an output shaft 54. The output shaft 54 is mechanically coupled to driven wheels 60.

The controller 70 controls the internal combustion engine 10 and operates operated units of the engine 10 such as the throttle valve 14, the fuel injection valve 16, and the ignition device 26, thereby controlling the torque and the ratios of exhaust components, which are controlled variables of the internal combustion engine 10. The controller 70 also controls the torque converter 40 and operates the lockup clutch 42 to control the engagement state of the lockup clutch 42. Further, the controller 70 controls and operates the transmission 50, thereby controlling the gear ratio, which is the controlled variable of the transmission 50. FIG. 1 shows operation signals MS1 to MS5 respectively corresponding to the throttle valve 14, the fuel injection valve 16, the ignition device 26, the lockup clutch 42, and the transmission 50.

To control the controlled variables, the controller 70 refers to an intake air amount Ga detected by an air flow meter 80, an opening degree of the throttle valve 14 detected by a throttle sensor 82 (throttle opening degree TA), and an output signal Scr of a crank angle sensor 84. The controller 70 also refers to a depression amount of an accelerator pedal 86 (accelerator operation amount PA) detected by an accelerator sensor 88 and an acceleration Gx in the front-rear direction of the vehicle VC1 detected by an acceleration sensor 90. The controller 70 refers to a mode variable MV, a target vehicle speed V* in a self-driving mode, and a signal indicating the state of the front of the vehicle VC1 obtained by a radar device 94. The mode variable MV indicates whether the user is instructing the self-driving mode or a manual driving mode when the user operates an instruction switch 92. The instruction switch 92 is a human machine interface that allows the user of the vehicle VC1 to instruct the manual driving mode or the self-driving mode and to instruct the target vehicle speed V* in the self-driving mode. The signal indicating the state of the front of the vehicle VC1 includes the information related to the distance between the vehicle VC1 and its front object and the information related to a relative speed between the vehicle VC1 and its front object.

The controller 70 includes a CPU 72, a ROM 74, a nonvolatile memory that can be electrically rewritten (memory device 76), and peripheral circuitry 78, which can communicate with one another through a local network 79. The peripheral circuitry 78 includes a circuit that generates a clock signal regulating operation inside the controller 70, a power supply circuit, and a reset circuit.

The ROM 74 stores a control program 74a and an adaptive cruise control program (ACC program 74b). The ACC program 74b is an execution command for the CPU 72 to control the traveling of the vehicle based on the state signal obtained by the radar device 94. Specifically, the execution command causes the speed of the vehicle VC1 to become the target vehicle speed V* while setting, in a prioritized manner, the distance between the vehicle VC1 and the front vehicle to be greater than or equal to a predetermined value.

The memory device 76 stores map data DM. In the map data DM, a command value of the throttle opening degree TA (throttle command value TA*) and a retardation amount aop of the ignition timing are used as output variables. The retardation amount aop is a retardation amount in relation to a predetermined reference ignition timing. The reference ignition timing is the more retarded one of the MBT ignition timing and the knock limit point. The MBT ignition timing is the ignition timing at which the maximum torque is obtained (maximum torque ignition timing). The knock limit point is the advancement limit value of the ignition timing at which knocking can be limited to an allowable level under the assumed best conditions when a large-octane-number fuel, which has a large knock limit value, is used. Further, the map data DM includes manual driving map data DM1 and self-driving map data DM2. In the manual driving map data DM1, the time-series data of the accelerator operation amount PA is used as an input variable. In the self-driving map data DM2, the time-series data of a command value of the torque (torque command value Trq*) of the internal combustion engine 10 is used as an input variable. The map data refers to a data set of discrete values of the input variable and values of the output variable each corresponding to a value of the input variable.

Figure 2:
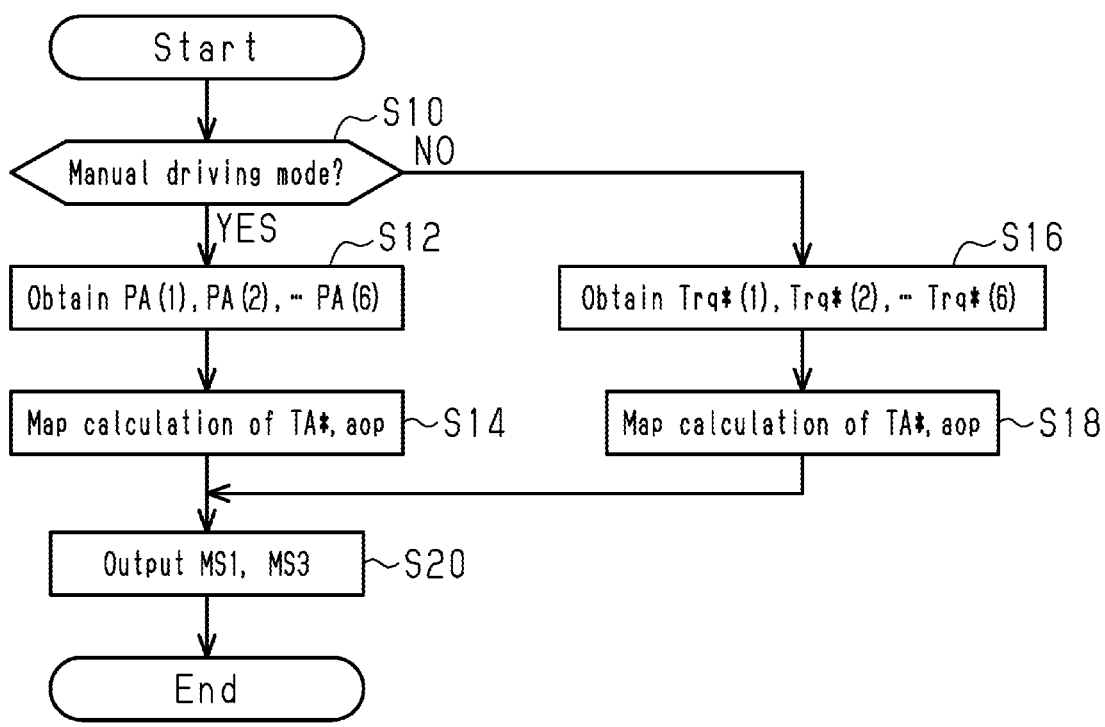
FIG. 2 is a flowchart showing a procedure of processes executed by the controller according to the first embodiment.

FIG. 2 shows a procedure of processes executed by the controller 70 of the present embodiment. The processes shown in FIG. 2 are implemented by the CPU 72 repeatedly executing programs stored in the ROM 74, for example, at predetermined intervals. In the following description, the number of each step is represented by the letter S followed by a numeral.

In the series of processes shown in FIG. 2, the CPU 72 first determines whether the value of the mode variable MV corresponds to the manual driving mode (S10). When determining that the value of the mode variable MV corresponds to the manual driving mode (S10: YES), the CPU 72 acquires time-series data including six sampled values PA(1), PA(2), . . . PA(6) of the accelerator operation amount PA (S12). The sampled values included in the time-series data have been sampled at different points in time. In the present embodiment, the time-series data includes six sampled values that are consecutive in time in a case in which the values are sampled at a constant sample period.

The CPU 72 uses the manual driving map data DM1 to execute map calculation of the throttle command value TA* and the retardation amount aop (S14). When, for example, the value of an input variable matches any of the values of the input variables on the map data, the map calculation uses the value of the corresponding output variable on the map data as the calculation result. When the value of the input variable does not match any of the values of the input variables on the map data, the map calculation uses a value obtained by interpolation of multiple values of the output variable included in the map data as the calculation result.

When determining that the value of the mode variable MV corresponds to the self-driving mode (S10: NO), the CPU 72 acquires time-series data including six sampled values Trq*(1), Trq*(2), . . . Trq*(6) of the torque command value Trq* (S16). The sampled values included in the time-series data have been sampled at different points in time. In the present embodiment, the time-series data includes six sampled values that are consecutive in time in a case in which the values are sampled at a constant sample period. The torque command value Trq* is calculated based on, for example, an output of the radar device 94 by the CPU 72 executing the ACC program 74b.

The CPU 72 uses the manual driving map data DM2 to execute map calculation of the throttle command value TA* and the retardation amount aop (S18).

When completing the process of S14 or S18, the CPU 72 outputs the operation signal MS1 to the throttle valve 14, thereby controlling the throttle opening degree TA, and outputs the operation signal MS3 to the ignition device 26, thereby controlling the ignition timing (S20). The present embodiment illustrates an example in which the throttle opening degree TA is feedback-controlled to the throttle command value TA*. Thus, even if the throttle command value TA* remains the same value, the operation signal MS1 may have different values. For example, when a known knock control system (KCS) is operating, the value obtained by retarding the reference ignition timing by the retardation amount aop is used as the value of the ignition timing corrected through feedback correction in the KCS. The reference ignition timing is varied by the CPU 72 in correspondence with the rotation speed NE of the crankshaft 28 and the charging efficiency η. The rotation speed NE is calculated by the CPU 72 based on the output signal Scr of the crank angle sensor 84. The charging efficiency η is calculated by the CPU 72 based on the rotation speed NE and the intake air amount Ga.

When completing the process of step S20, the CPU 72 temporarily suspends the series of processes shown in FIG. 2.

Figure 3:
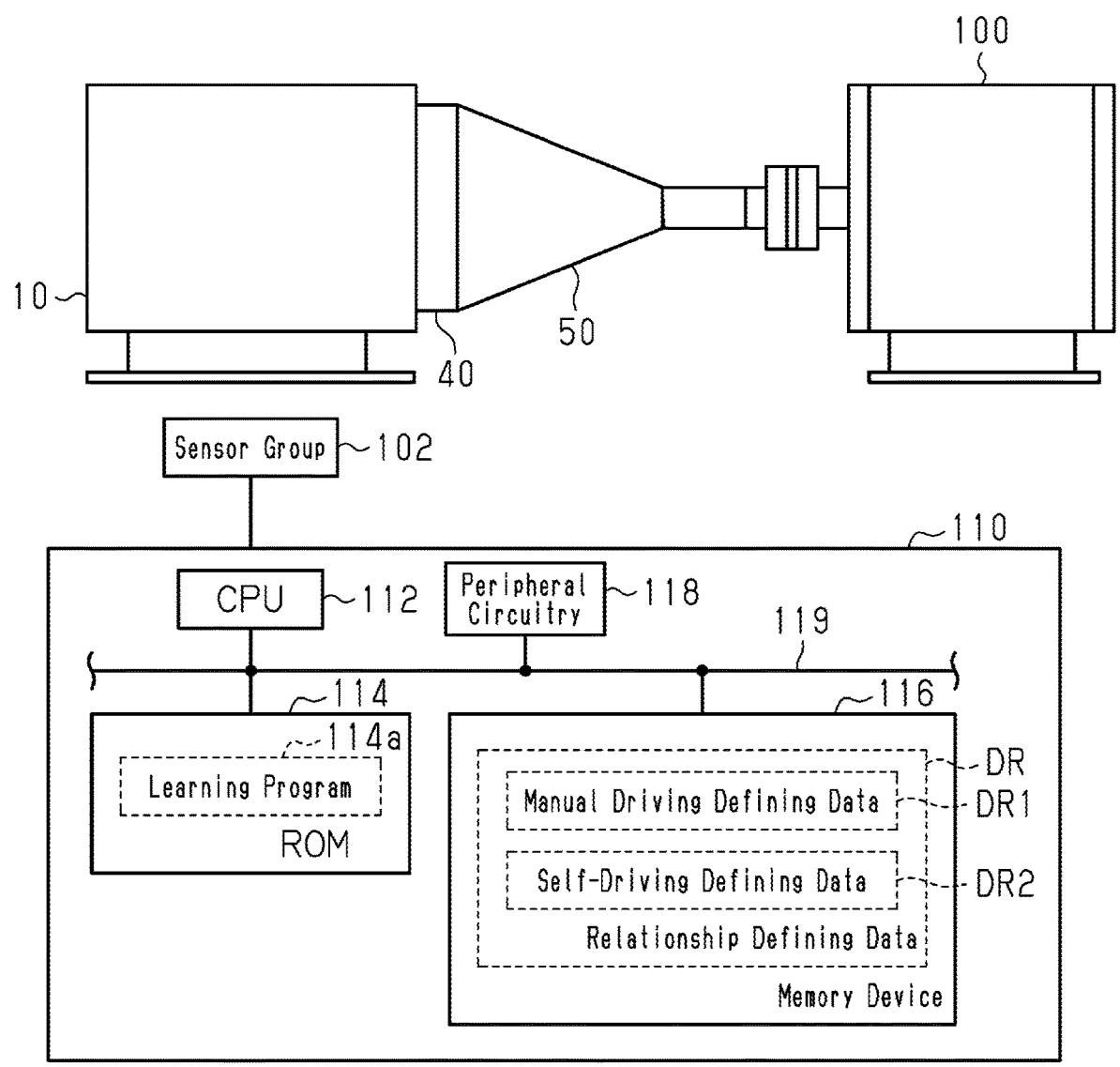
FIG. 3 is a diagram showing a system that generates map data according to the first embodiment.

FIG. 3 shows a system that generates the map data DM.

As shown in FIG. 3, in the present embodiment, the crankshaft 28 (see FIG. 1) of the internal combustion engine 10 is mechanically coupled to a dynamometer 100 via the torque converter 40 and the transmission 50. Various state variables obtained by operating the internal combustion engine 10 are detected by a sensor group 102, and the detection results are input to a generation device 110, which is a computer that generates the map data DM. The sensor group 102 includes the sensors and the like installed in the vehicle VC1 in FIG. 1.

The generation device 110 includes a CPU 112, a ROM 114, a nonvolatile memory that can be electrically rewritten (memory device 116), and peripheral circuitry 118, which can communicate with each other through a local network 119. The memory device 116 stores relationship defining data DR. The relationship defining data DR defines the relationship between the time-series data of the accelerator operation amount PA or the torque command value Trq* serving as state variables and the throttle command value TA* and the retardation amount aop serving as action variables. The relationship defining data DR includes manual driving defining data DR1, which uses the time-series data of the accelerator operation amount PA as a state variable, and self-driving defining data DR2, which uses the time-series data of the torque command value Trq* as a state variable. The ROM 114 stores a learning program 114a, which learns the relationship defining data DR through reinforcement learning.

Figure 4:
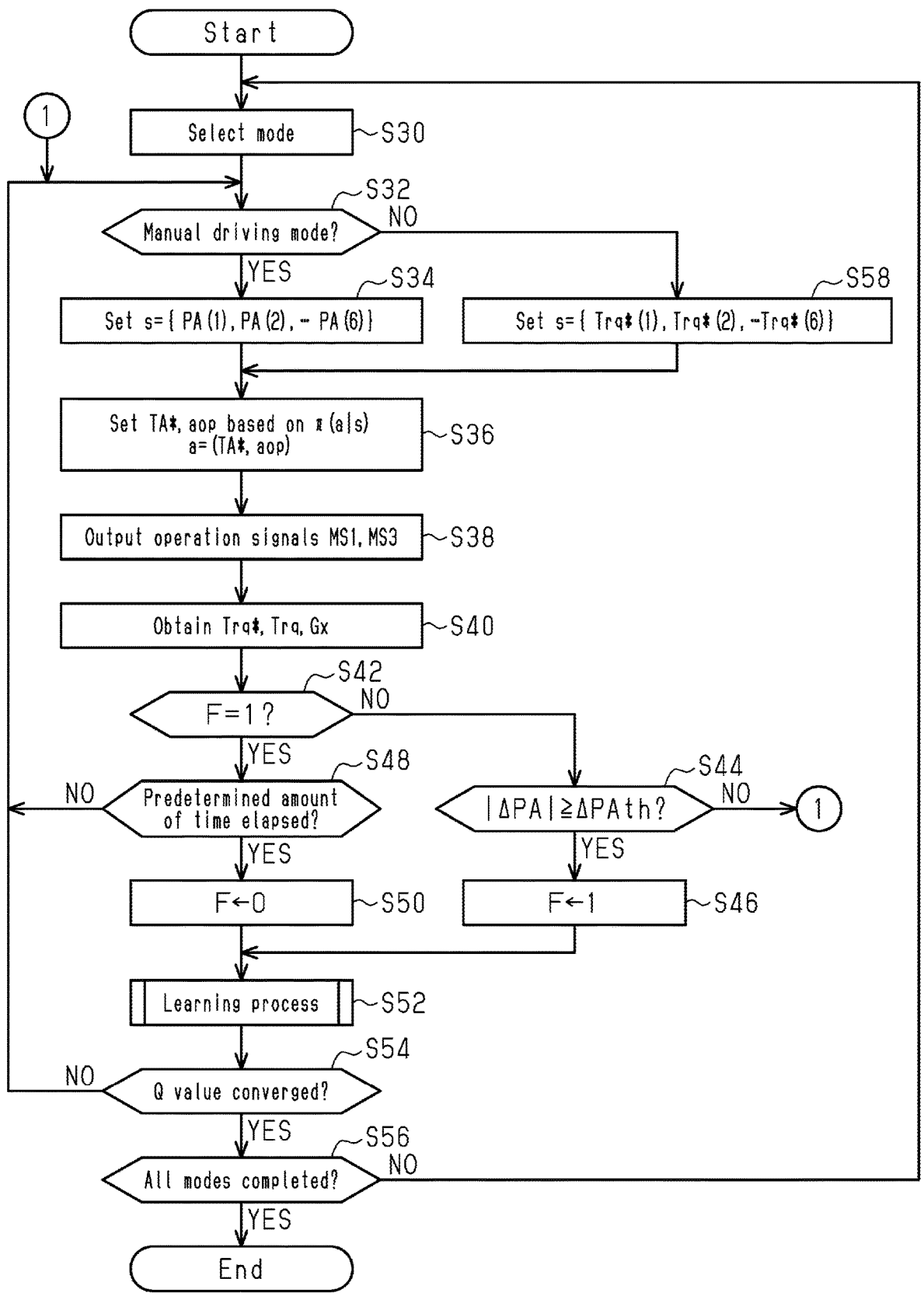
FIG. 4 is a flowchart showing a procedure of processes executed by the system according to the first embodiment.

FIG. 4 shows a procedure for processes executed by the generation device 110. The process shown in FIG. 4 is implemented by the CPU 112 executing the learning program 114a stored in the ROM 114.

In the series of processes shown in FIG. 4, the CPU 112 first selects the manual driving mode or the self-driving mode (S30). Next, the CPU 112 determines whether the selected mode is the manual driving mode (S32). When determining that the selected mode is the manual driving mode (S32: YES), the CPU 112 acquires the time-series data of the accelerator operation amount PA as a state s with the internal combustion engine 10 running (S34). Although the time-series data is the same as the data in the process of S12 in FIG. 2, the system shown in FIG. 3 does not include the accelerator pedal 86. It is thus assumed that the accelerator operation amount PA has been virtually generated by the generation device 110 simulating the state of the vehicle VC1. That is, the virtually-generated accelerator operation amount PA is regarded as a vehicle state that is based on the detection value of the sensor.

Next, in accordance with a policy π defined by the manual driving defining data DR1, the CPU 112 sets an action a corresponding to the state s obtained through the process of S34 (S36). The action a includes the throttle command value TA* and the retardation amount aop that correspond to the obtained state s.

In the present embodiment, the manual driving defining data DR1 is used to define an action value function Q and the policy tr. In the present embodiment, the action value function Q is a table-type function representing values of expected return in accordance with eight-dimensional independent variables of the state s and the action a. When a state s is provided, the action value function Q includes values of the action a at which the independent variable is the provided state s. Among these values, the one at which the expected return is maximized is referred to as a greedy action. The policy n defines rules with which the greedy action is preferentially selected, and an action a different from the greedy action is selected with a predetermined probability.

Specifically, the number of the values of the independent variable of the action value function Q according to the present embodiment is set by deleting a certain amount from all the possible combinations of the state s and the action a, referring to human knowledge and the like. For example, in time-series data of the accelerator operation amount PA, human operation of the accelerator pedal 86 would never create a situation in which one of two consecutive values is the minimum value of the accelerator operation amount PA and the other is the maximum value of the accelerator operation amount PA. Accordingly, the action value function Q is not defined for this combination of the values of the accelerator operation amount PA. In the present embodiment, reduction of the dimensions based on human knowledge limits the number of the possible values of the state s defined by the action value function Q to a number less than or equal to 10 to the fourth power, and preferably, to a number less than or equal to 10 to the third power.

Then, in the same manner as the process of S20, the CPU 112 outputs the operation signals MS1, MS3 based on the set throttle command value TA* and retardation amount aop (S38). Subsequently, the CPU 112 obtains the torque command value Trq* for the internal combustion engine 10, the acceleration Gx, and a torque Trq of the internal combustion engine 10 (S40). In this step, the CPU 112 calculates the torque Trq based on the gear ratio of the transmission 50 and a load torque generated by the dynamometer 100. Further, the CPU 112 sets the torque command value Trq* in accordance with the accelerator operation amount PA. Furthermore, the CPU 112 calculates the acceleration Gx based on, for example, the load torque generated by the dynamometer 100 as a value that is assumed to occur in the vehicle if the vehicle is hypothetically equipped with the internal combustion engine 10 and the like. That is, in the present embodiment, while the acceleration Gx is a virtual parameter, the acceleration Gx is regarded as the detection value of the vehicle state.

Next, the CPU 112 determines whether a transient flag F is 1 (S42). The value 1 of the transient flag F indicates that a transient operation is being performed, and the value 0 of the transient flag F indicates that the transient operation is not being performed. When determining that the transient flag F is 0 (S42: NO), the CPU 112 determines whether the absolute value of a change amount per unit time ΔPA of the accelerator operation amount PA is greater than or equal to a predetermined amount ΔPAth (S44). The change amount ΔPA simply needs to be the difference between the latest accelerator operation amount PA at the point in time of execution of S42 and the accelerator operation amount PA of the point in time that precedes the execution of S40 by a certain amount of time.

When determining that the absolute value of the change amount ΔPA is greater than or equal to the predetermined amount ΔPAth (S44: YES), the CPU 112 assigns 1 to the transient flag F (S46). When determining that the absolute value of the change amount ΔPA is less than predetermined amount ΔPAth (S44: NO), the CPU 112 returns to the process of S32.

In contrast, when determining that the transient flag F is 1 (S42: YES), the CPU 112 determines whether a predetermined amount of time has elapsed from when the process of S46 was performed (S48). The predetermined amount of time is an amount of time during which the absolute value of the change amount per unit time ΔPA of the accelerator operation amount PA remains less than or equal to a specified amount that is less than the predetermined amount ΔPAth. When determining that the predetermined amount of time has elapsed from when the process of S46 was performed (S48: YES), the CPU 112 assigns 0 to the transient flag F (S50). When determining that the predetermined amount of time has not elapsed from when the process of S46 was performed (S48: NO), the CPU 112 returns to the process of S32.

When the process of S46 or S50 is completed, the CPU 112 assumes that one episode has ended and performs reinforcement learning to update the action value function Q (S52).

Figure 5:
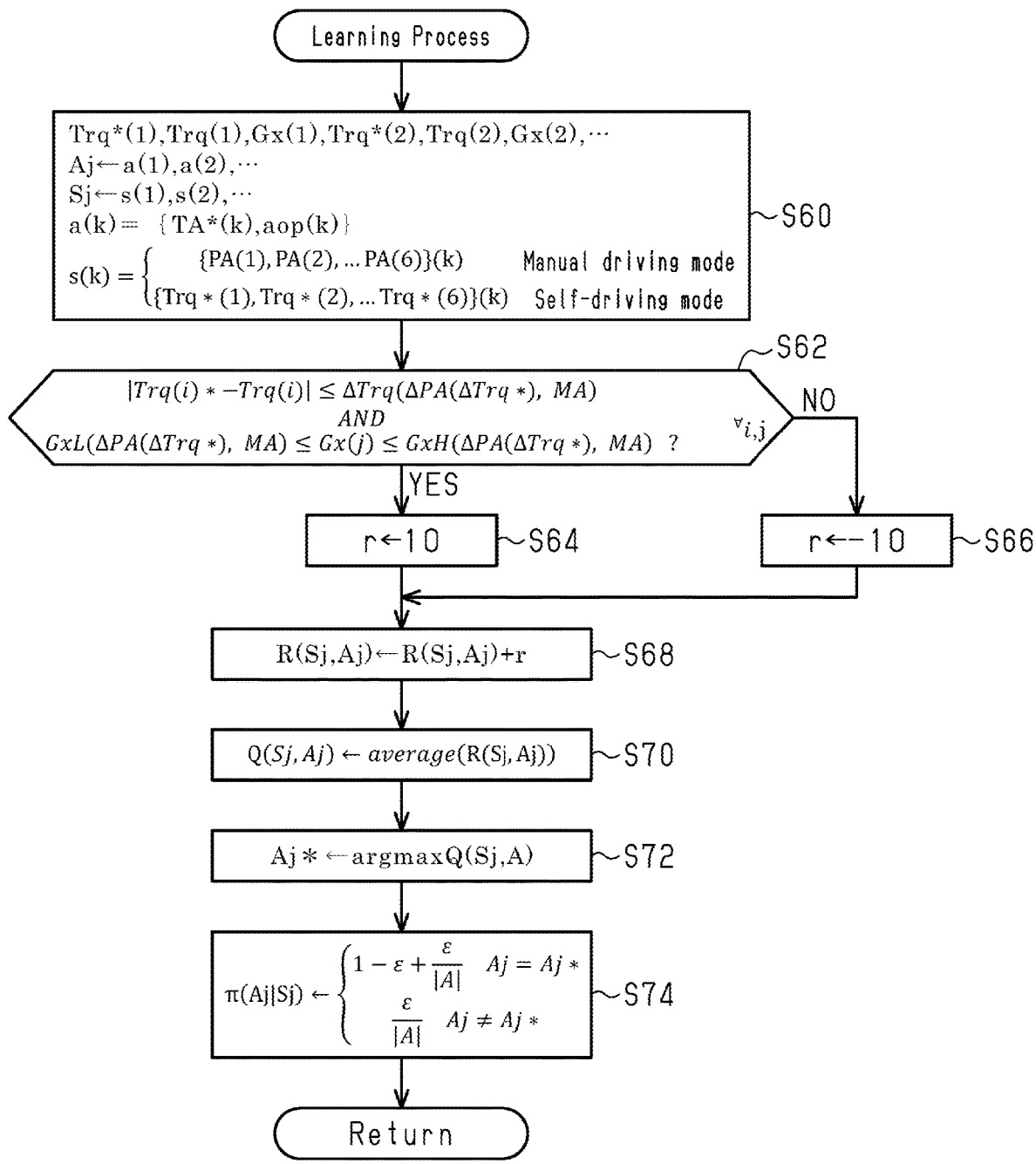
FIG. 5 is a flowchart illustrating the details of a learning process according to the first embodiment.

FIG. 5 illustrates the details of the process of S52.

In the series of processes shown in FIG. 5, the CPU 112 acquires time-series data including groups of sampled values of the torque command value Trq* the torque Trq, and the acceleration Gx in the episode that has been ended most recently, and time-series data of the state s and the action a (S60). The most recent episode has a time period during which the transient flag F was continuously 0 if the process of S60 of FIG. 5 is executed after the process of S46 of FIG. 4. The most recent episode has a time period during which the transient flag F was continuously 1 if the process of S60 of FIG. 5 is executed after the process of S50 of FIG. 4.

In FIG. 5, variables of which the numbers in parentheses are different are variables at different sampling points in time. For example, a torque command value Trq*(1) and a torque command value Trq*(2) have been obtained at different sampling points in time. The time-series data of the action a belonging to the most recent episode is defined as an action set Aj, and the time-series data of the state s belonging to the same episode is defined as a state set Sj.

Next, the CPU 112 determines whether the logical conjunction of the following conditions (i) and (ii) is true (S62). The condition (i) is that the absolute value of the difference between an arbitrary torque Trq belonging to the most recent episode and the torque command value Trq* is less than or equal to a specified amount ΔTrq. The condition (ii) is that the acceleration Gx is greater than or equal to a lower limit GxL and less than or equal to an upper limit GxH.

In the manual driving mode, the CPU 112 varies the specified amount ΔTrq depending on the change amount per unit time ΔPA of the accelerator operation amount PA at the start of the episode. That is, the CPU 112 determines that the episode is related to transient time if the absolute value of the change amount per unit time ΔPA is great and sets the specified amount ΔTrq to a greater value than in a case in which the episode is related to steady time. In the self-driving mode, the CPU 112 varies the specified amount ΔTrq depending on a change amount per unit time ΔTrq* of the torque command value Trq* at the start of the episode. That is, the CPU 112 determines that the episode is related to transient time if the absolute value of the change amount ΔTrq* is great and sets the specified amount ΔTrq to a greater value than in a case in which the episode is related to steady time. The CPU 112 sets the specified amount ΔTrq to be smaller in the manual driving mode than in the self-driving mode.

In the manual driving mode, the CPU 112 varies the lower limit GxL depending on the change amount ΔPA of the accelerator operation amount PA at the start of the episode. In the self-driving mode, the CPU 112 varies the lower limit GxL depending on the change amount ΔTrq* of the torque command value Trq* at the start of the episode. That is, when the episode is related to transient time and the change amount per unit time ΔPA has a positive value, the CPU 112 sets the lower limit GxL to a greater value than in a case in which the episode is related to steady time. When the episode is related to transient time and the change amount per unit time ΔPA has a negative value, the CPU 112 sets the lower limit GxL to a smaller value than in a case in which the episode is related to steady time.

In the manual driving mode, the CPU 112 varies the upper limit GxH with the change amount per unit time ΔPA of the accelerator operation amount PA at the start of the episode. In the self-driving mode, the CPU 112 varies the lower limit GxL depending on the change amount ΔTrq* of the torque command value Trq* at the start of the episode. That is, when the episode is related to transient time and the change amount per unit time ΔPA has a positive value, the CPU 112 sets the upper lower limit GxH to a greater value than in a case in which the episode is related to steady time. When the episode is related to transient time and the change amount per unit time ΔPA has a negative value, the CPU 112 sets the lower upper limit GxH to a smaller value than in a case in which the episode is related to steady time.

Further, the CPU 112 varies the upper limit GxH and the lower limit GxL in correspondence with the value of the mode variable MV. Specifically, the CPU 112 sets the upper limit GxH and the lower limit GxL such that they are permitted to become a greater value as the absolute value of acceleration Gx during the transient time in the manual driving mode than in the self-driving mode.

When determining that the logical conjunction of the condition (i) and the condition (ii) is true (S62: YES), the CPU 112 assigns 10 to a reward r (S64). When determining that the logical conjunction is false (S62: NO), the CPU 72 assigns −10 to the reward r (S66). The processes from S62 to S66 provide a greater reward when a standard related to drivability is met than when the standard is not met. When the process of S64 or S66 is completed, the CPU 112 updates the relationship defining data DR stored in the memory device 76 shown in FIG. 3. In the present embodiment, the relationship defining data DR is updated by the e-soft on-policy Monte Carlo method.

That is, the CPU 112 adds the reward r to respective returns R(Sj, Aj), which are determined by pairs of the states obtained through the process of S60 and actions corresponding to the respective states (S68). R(Sj, Aj) collectively represents the returns R each having one of the elements of the state set Sj as the state and one of the elements of the action set Aj as the action. Next, the CPU 112 averages each of the returns R(Sj, Aj), which are determined by pairs of the states and the corresponding actions obtained through the process of S60, and assigns the averaged values to the corresponding action value functions Q(Sj, Aj) (S70). The averaging process simply needs to be a process of dividing the return R, which is calculated through the process of S68, by a number obtained by the number of times the process S68 has been executed. The initial value of the return R simply needs to be 0.

Next, for each of the states obtained through the process of S60, the CPU 112 assigns, to an action Aj*, an action that is the combination of the throttle command value TA* and the retardation amount aop when the corresponding action value function Q(Sj, A) has the maximum value (S72). The sign A represents an arbitrary action that can be taken. The action Aj* can have different values depending on the type of the state obtained through the process of S60. In view of simplification, the action Aj* has the same sign regardless of the type of the state in the present description.

Next, the CPU 112 updates the policy π corresponding to each of the states obtained through the process of S60 (S74). That is, the CPU 112 sets the selection probability of the action Aj* selected through S72 to $(1-\varepsilon)+\varepsilon/|A|$, where $|A|$ represents the total number of actions. The number of the actions other than the action Aj* is represented by $|A|-1$. The CPU 112 sets the selection probability of each of the actions other than the action Aj* to $\varepsilon/|A|$. The process of S74 is based on the action value function Q, which has been updated through the process of S70. Accordingly, the relationship defining data DR, which defines the relationship between the state s and the action a, is updated to increase the return R.

When the process of step S74 is completed, the CPU 112 temporarily suspends the series of processes shown in FIG. 5.

Referring back to FIG. 4, when the process of S52 is completed, the CPU 112 determines whether the action value function Q has converged (S54). In step S54, the CPU 112 simply needs to determine that the action value function Q has converged when the number of times the amount of the action value function Q updated by the process of S52 successively becomes a predetermined value reaches a predetermined number of times.

When determining that the action value function Q has not converged (S54: NO), the CPU 112 returns to the process of S32. When determining that the action value function Q has converged (S54: YES), the CPU 112 determines whether the CPU 112 has made an affirmative determination in the process of S54 both for the manual driving mode and the self-driving mode (S56).

When determining that the CPU 112 has not made an affirmative determination in one of the two modes in the process of S54 (S56: NO), the CPU 112 returns to the process of S30 and selects the mode for which the affirmative determination has not been made in the process of S54. When making a negative determination in the process of S32, the CPU 112 sets the torque command values Trq*(1), Trq*(2), . . . , Trq*(6) as the state s (S58) and repeats the processes from S36 to S4. For the process of S36, the self-driving defining data DR2 is used. The self-driving defining data DR2 is the same as the manual driving defining data DR1 except for the state s serving as an independent variable of the action value function Q. The torque command value Trq* obtained in the process of S40 is set as the latest one of the values set in the process of S58. The torque command values Trq*(1), Trq*(2), . . . , Trq*(6) used here are obtained by the generation device 110 simulating the values generated when the commands specified by the ACC program 74b are executed based on an output of the radar device 94 in the vehicle. Thus, in the present embodiment, the torque command values Trq*(1), Trq*(2), . . . , Trq*(6) used here are regarded as vehicle states that are based on the detection value of the sensor.

When making an affirmative determination in the process of S56, the CPU 112 temporarily suspends the series of processes shown in FIG. 4.

Figure 6:
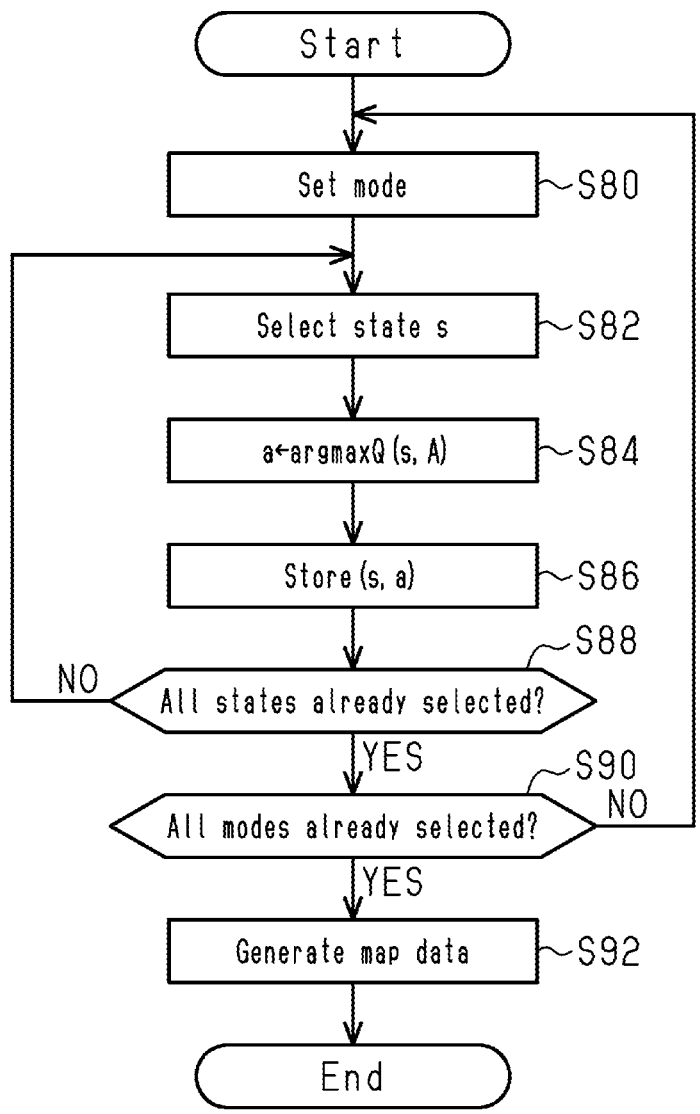
FIG. 6 is a flowchart showing a procedure of a generation process of the map data according to the first embodiment.

FIG. 6 shows a procedure of processes of, in particular, generating the map data DM based on the action value function Q learned by the process of FIG. 4, in the processes executed by the generation device 110. The process shown in FIG. 6 is implemented by the CPU 112 executing the learning program 114a stored in the ROM 114.

In the series of processes shown in FIG. 6, the CPU 112 first sets the manual driving mode or the self-driving mode (S80). Then, the CPU 112 selects one of plural states s that serves as the value of the input variable corresponding to one of the manual driving map data DM1 and the self-driving map data DM2 that has been set by the process of S80 (S82). Next, the CPU 112 selects the action a that maximizes the value of one of the action value functions Q (s, A) that correspond to the state s and are defined by the data of one of the manual driving defining data DR1 and the self-driving defining data DR2 that corresponds to the mode set by the process of S50 (S84). That is, the action a is selected by a greedy policy. Subsequently, the CPU 112 causes the memory device 116 to store a set of the state s and the action a (S86).

Then, the CPU 112 determines whether the process of S82 has selected all the states of the values of the input variables of one of the manual driving map data DM1 and the self-driving map data DM2 that corresponds to the mode set by the process of S80 (S88). When determining that there is an unselected state s (S88: NO), the CPU 112 returns to the process of S82. When determining that all the states s have been selected (S88: YES), the CPU 112 determines whether the manual driving mode and the self-driving mode have both been set by the process of S80 (S90). When determining that there is a mode that has not been set yet (S90: NO), the CPU 112 returns to the process of S80 and sets the mode that has not been set yet.

When determining that all the modes have already been set (S90: YES), the CPU 112 generates the manual driving map data DM1 and the self-driving map data DM2 (S92). In this step, the value of the output variable corresponding to the data in which the value of the input variable of the map data DM is the state s is set as the corresponding action a.

When the process of step S92 is completed, the CPU 112 temporarily suspends the series of processes shown in FIG. 6.

The operation and advantage of the present embodiment will now be described.

In the system shown in FIG. 3, the CPU 112 learns the action value function Q through reinforcement learning. When the value of the action value function Q converges, it is assumed that an action suitable for meeting the standard required for drivability has been learned. Then, for each of the states serving as the input variables of the map data DM, the CPU 112 selects the action that maximizes the action value function Q and stores a set of the state and action in the memory device 116. Next, the CPU 112 uses the set of the state and action stored in the memory device 116 to generate the map data DM. This allows a suitable throttle command value TA* and a suitable retardation amount aop that correspond to the accelerator operation amount PA and the torque command value Trq* to be set without excessively increasing the man-hours by skilled workers.

Particularly, in the present embodiment, each of the manual driving mode and the self-driving mode separately learns the action a corresponding to the state s. Specifically, the manual driving mode provides a reward by setting a standard that increases the followability for a command value of the propelling force of the vehicle to a larger extent than for the self-driving mode. In contrast, the self-driving mode provides a reward by setting a standard in which the magnitude of the acceleration of the vehicle in the front-rear direction is larger than for the manual driving mode. Thus, the manual driving map data DM1 enables a control with a favorable responsivity for the accelerator operation performed by the user. Further, the self-driving map data DM2 enables a control that prevents the user from experiencing sudden acceleration. This saves the trouble of adapting the torque command value Trq* generated through the execution of the ACC program 74b by taking into account the acceleration experienced by the user. In this manner, when each episode ends, the CPU 112 updates the relationship defining data DR by providing a reward according to whether the torque or acceleration meets its standard. The CPU 112 provides the reward r such that the requirement of the followability for the torque command value Trq* is loosened to a larger extent in the self-driving mode than in the manual driving mode and provides the reward r based on the standard in which the magnitude of the acceleration Gx is smaller in the self-driving mode than in the manual driving mode.

The above-described present embodiment further provides the following operation and advantages.

(1) The memory device 76 of the controller 70 stores the map data DM instead of, for example, the action value function Q. Thus, the CPU 72 sets the throttle command value TA* and the retardation amount aop based on the map calculation that uses the map data DM. Accordingly, as compared with when executing, for example, a process that selects one of the action value functions Q that has the maximum value, the computation load is reduced.

(2) The time-series data of the accelerator operation amount PA is included in the independent variable of the action value function Q. Thus, as compared with when, for example, only a single sampled value for the accelerator operation amount PA is set as the independent variable, the value of the action a is finely adjusted for various changes in the accelerator operation amount PA.

(3) The throttle command value TA* is included in the independent variable of the action value function Q. Thus, as compared with when, for example, parameters in a model expression in which the behavior of the throttle command value TA* is modelled are set as the independent variable for the throttle opening degree, the degree of freedom of searching through reinforcement learning is easily increased.

Second Embodiment

A second embodiment will now be described with reference to FIGS. 7 and 8. Differences from the first embodiment will mainly be discussed.

Figure 7:
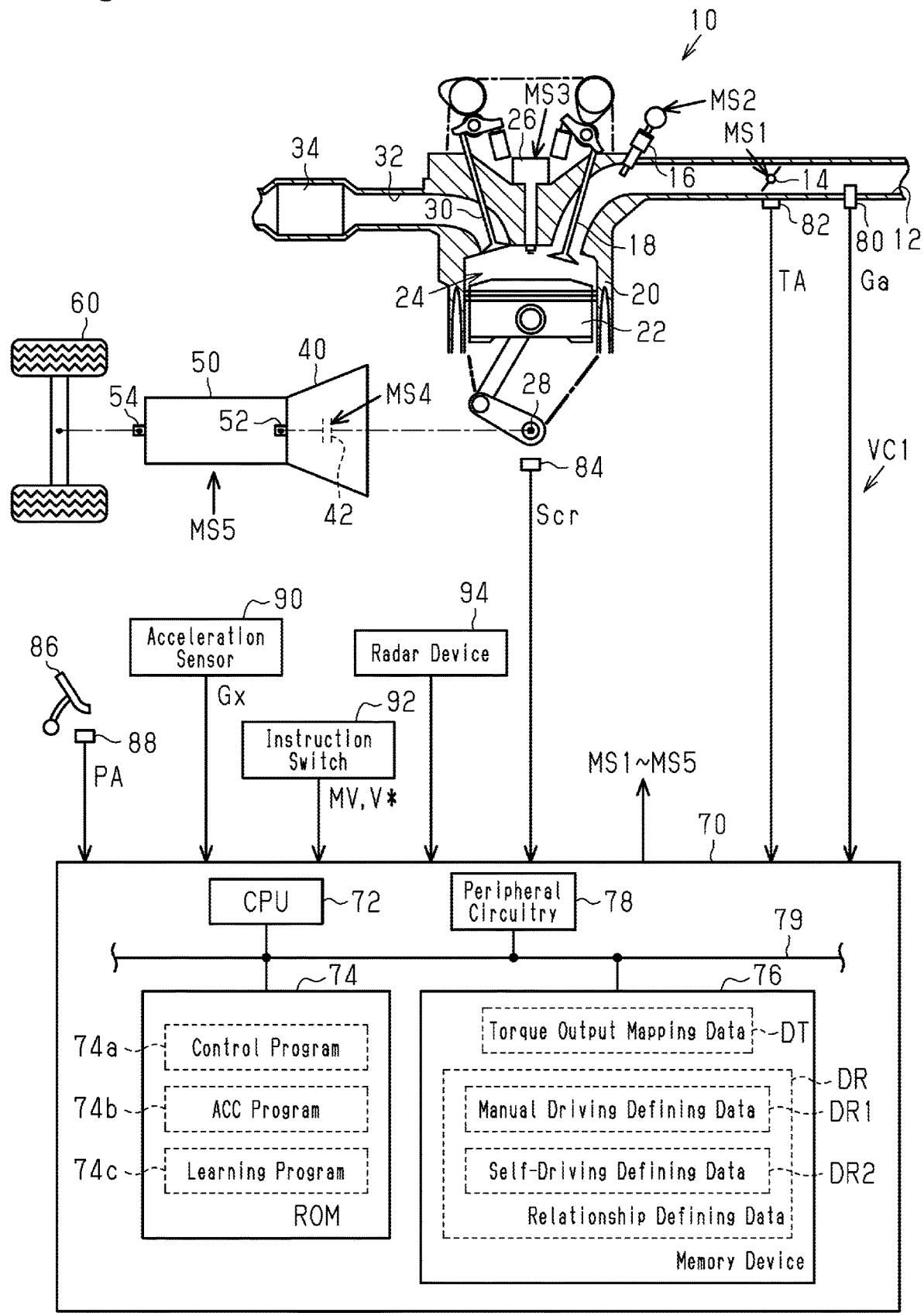
FIG. 7 is a diagram showing the controller and its drive system according to a second embodiment of the present disclosure.

FIG. 7 shows the configuration of the drive system of the vehicle VC1 and the controller 70 according to the present embodiment. In FIG. 7, the same reference numerals are given to the components that are the same as those in FIG. 1 for the illustrative purposes.

As shown in FIG. 7, in the present embodiment, the ROM 74 stores a learning program 74c in addition to the control program 74a and the ACC program 74b. The memory device 76 stores the relationship defining data DR instead of the map data DM and stores torque output mapping data DT. The relationship defining data DR refers to the data that has already been learned by the process of FIG. 4, and includes the manual driving defining data DR1 and the self-driving defining data DR2. The manual driving defining data DR1 includes an action value function in which the state s is the time-series data of the accelerator operation amount PA. The self-driving defining data DR2 includes an action value function in which the state s is the time-series data of the torque command value Trq*. The torque output mapping data DT defines a torque output map. The torque output map is the data related to a pre-trained model, such as a neural network in which the rotation speed NE, the charging efficiency ti, and the ignition timing are input to the torque output map, which outputs the torque Trq. The torque output mapping data DT simply needs to be, for example, learned by using, as training data, the torque Trq obtained by the process of S40 when the process of FIG. 4 is executed.

Figure 8:
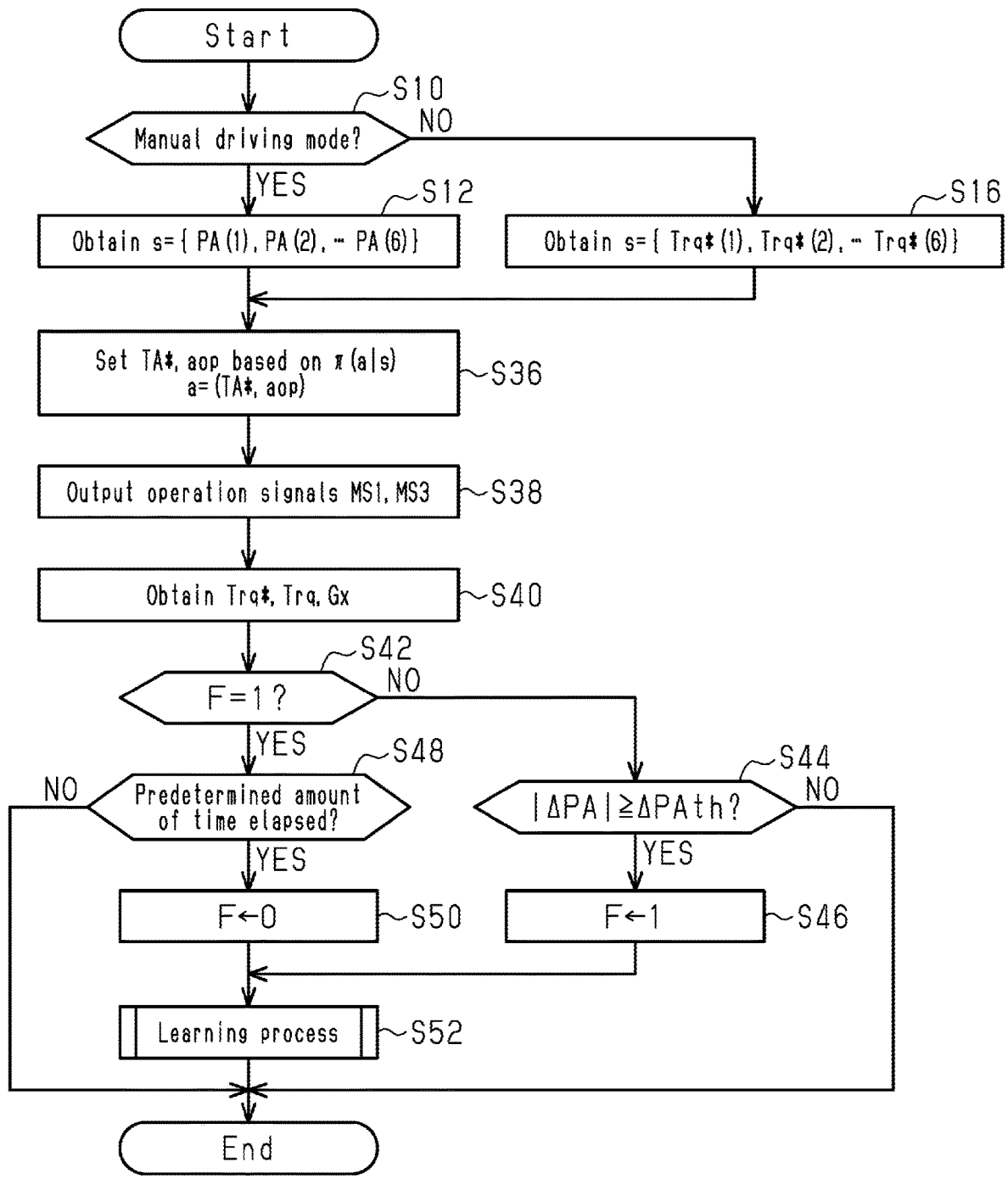
FIG. 8 is a flowchart showing a procedure of processes executed by the controller according to the second embodiment.

FIG. 8 shows a procedure of processes executed by the controller 70 of the present embodiment. The processes shown in FIG. 8 are implemented by the CPU 72 repeatedly executing the control program 74a and the learning program 74c stored in the ROM 74, for example, at predetermined intervals. In FIG. 8, the same step numbers are given to the processes that correspond to those in FIG. 4.

In the series of processes shown in FIG. 8, the CPU 72 first executes the processes corresponding to S10, S12, S16 in FIG. 2 and then executes the processes corresponding to S36 to S52 in FIG. 4. When making a negative determination in the process of S44 or S48 or completing the process of S52, the CPU 72 temporarily suspends the series of processes shown in FIG. 8. The processes of S10, S12, S16, S36 to S50 are implemented by the CPU 72 executing the control program 74a, and the process of S52 is implemented by the CPU 72 executing the learning program 74c.

As described above, in the present embodiment, the relationship defining data DR and the learning program 74c are implemented in the controller 70. Accordingly, as compared with the first embodiment, the learning frequency improves.

Third Embodiment

A third embodiment will now be described with reference to FIGS. 9 and 10. Differences from the second embodiment will mainly be discussed.

In the present embodiment, the relationship defining data DR is updated outside the vehicle VC1.

Figure 9:
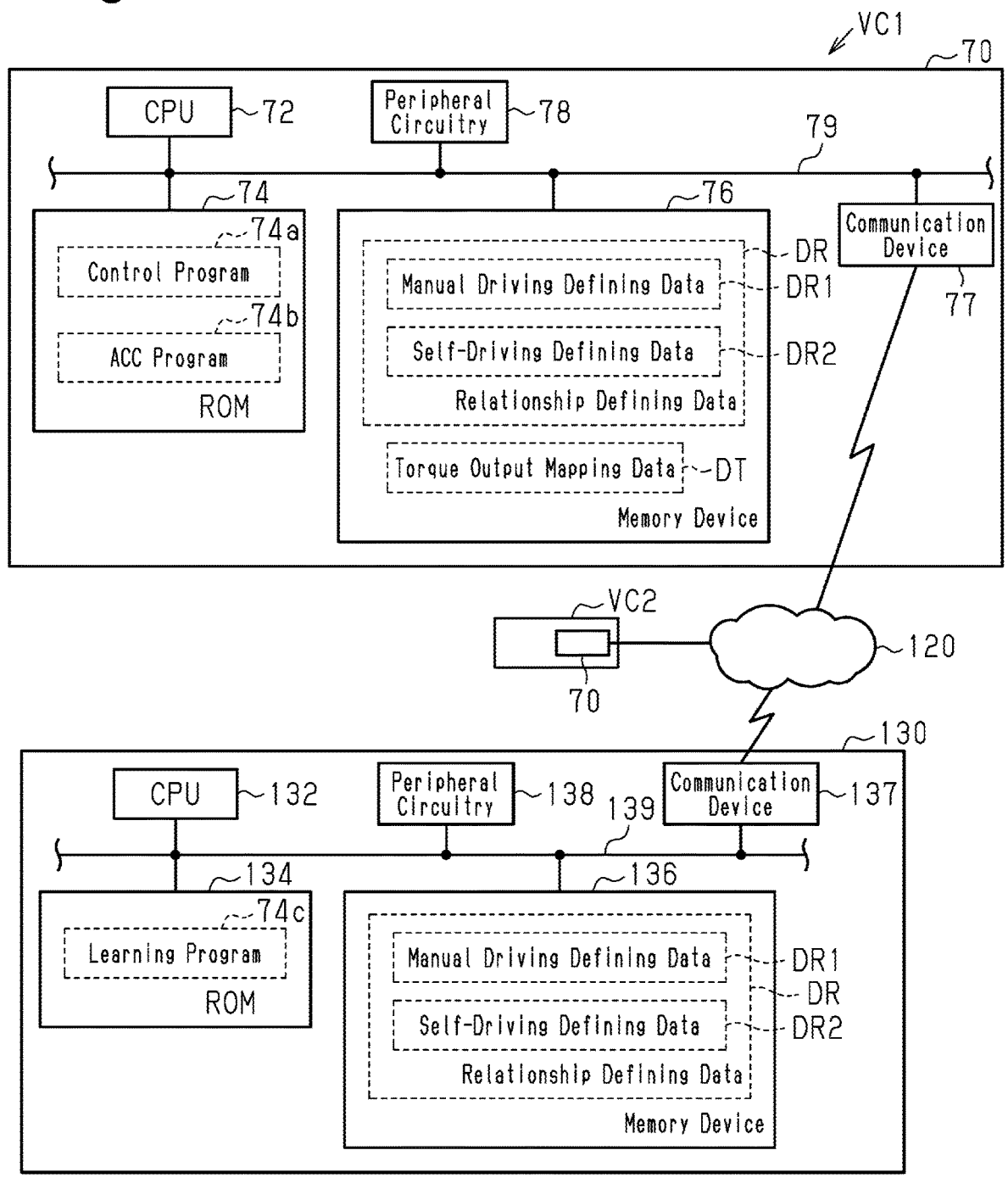
FIG. 9 is a diagram showing the configuration of a system according to a third embodiment of the present disclosure.

FIG. 9 shows the configuration of a control system that performs reinforcement learning. In FIG. 9, the same reference numerals are given to the components that are the same as those in FIG. 1 for the illustrative purposes.

The ROM 74 of the controller 70 in the vehicle VC) shown in FIG. 9 stores the control program 74a and the ACC program 74b, but does not store the learning program 74c. The controller 70 includes a communication device 77. The communication device 77 communicates with a data analysis center 130 via a network 120 outside the vehicle VC1.

The data analysis center 130 analyzes data transmitted from vehicles VC1, VC2, . . . . The data analysis center 130 includes a CPU 132, a ROM 134, a nonvolatile memory that can be electrically rewritten (memory device 136), peripheral circuitry 138, and a communication device 137, which can communicate with each other through a local network 139. The ROM 134 stores the learning program 74c, and the memory device 136 stores the relationship defining data DR.

FIG. 10 shows a procedure of processes of reinforcement learning according to the present embodiment. The process shown in a section (a) of FIG. 10 is implemented by the CPU 72 executing the control program 74a stored in the ROM 74 shown in FIG. 9. The process shown in a section (b) of FIG. 10 is implemented by the CPU 132 executing the learning program 74c stored in the ROM 134. In FIG. 10, the same step numbers are given to the processes that correspond to those in FIG. 8. The process shown in FIG. 10 will now be described with reference to the temporal sequence of the reinforcement learning.

In the series of processes shown in the section (a) of FIG. 10, the CPU 72 executes the processes of S10, S12, S16, S36 to S50 and then operates the communication device 77 to transmit data necessary for the update process of the relationship defining data DR (S100). The transmitted data includes the value of the mode variable MV in an episode ended immediately prior to the execution of the process of S46 or S50, the time-series data of the torque command value Trq*, torque Trq, and acceleration Gx, and the state set Sj and action set Aj.

As shown in the section (b) of FIG. 10, the CPU 132 receives the data transmitted from the vehicle VC1 (S110), and updates the relationship defining data DR based on the received data (S52). The CPU 132 determines whether the number of times of update of the relationship defining data DR is greater than or equal to a predetermined number of times (S112). When determining that the number of times of update is greater than or equal to the predetermined number of times (S112: YES), the CPU 132 operates the communication device 137 to transmit the relationship defining data DR to the vehicle VC1, which transmitted the data that was received by the data analysis center 130 through the process of S110 (S114). When completing the process of S114 or when making a negative determination in the process of S112, the CPU 132 temporarily suspends the series of processes shown in the section (b) of FIG. 10.

As shown in the section (a) of FIG. 10, the CPU 72 determines whether there is updated data related to the relationship defining data DR (S102). When determining that there is updated data (S102: YES), the CPU 72 receives the updated relationship defining data DR (S104). Then, the CPU 72 rewrites the relationship defining data DR used in the process of S36 with the received relationship defining data DR (S106). When completing the process of S106 or when making a negative determination in the process of any of S44, S48, and S102, the CPU 72 temporarily suspends the series of processes shown in the section (a) of FIG. 10.

As described above, the present embodiment updates the relationship defining data DR outside the vehicle VC1. This reduces the computation load on the controller 70. Further, if the process of S52 is executed by the receiving data from multiple vehicles VC1, VC2 in the process of S110, the number of data sets used for learning can be increased easily.

Correspondence

The correspondence between the items in the above exemplary embodiments and the items described in the above SUMMARY is as follows. Below, the correspondence is shown for each of the numbers in the examples described in the above SUMMARY.

[1], [2] The propelling force generator corresponds to the internal combustion engine 10.

The execution device corresponds to the CPU 72 and ROM 74 in FIG. 7, the CPU 112 and ROM 114 in FIG. 3, and the CPUs 72, 132 and ROMs 74, 134 in FIG. 9. The memory device corresponds to the memory device 76 in FIG. 7, the memory device 116 in FIG. 3, and the memory devices 76, 136 in FIG. 9.

The operation process corresponds to the process of S38, and the obtaining process corresponds to the processes of S12, S16, S34, S40, S58.

The reward calculating process corresponds to the processes from S62 to S66. The update process corresponds to the processes from S68 to S74.

The update map corresponds to the map defined by the execution commands of the processes of S68 to S74 performed by the learning program 74c.

The changing process corresponds to varying the specified amount $\Delta$Trq, the lower limit GxL, and the upper limit GxH in correspondence with the mode variable MV in the process of S62.

[3] The control mapping data refers to the map data DM.

[4] The vehicle controller corresponds to the controller 70 shown in FIG. 7.

[5]-[7] The first execution device corresponds to the CPU 72 and the ROM 74 in FIG. 9, and the second execution device corresponds to the CPU 132 and the ROM 134 in FIG. 9.

Other Embodiments

The present embodiment may be modified as follows. The above-described embodiments and the following modifications can be combined as long as the combined modifications remain technically consistent with each other.

Regarding Self-Driving Mode

The self-driving mode is not limited to ACC. Instead, for example, the self-driving mode may be to automate the steering system.

Regarding Action Variable

In the above-described embodiments, the throttle command value TA* is used as an example of the variable related to the opening degree of a throttle valve, which is an action variable. However, the present disclosure is not limited to this. For example, the responsivity of the throttle command value TA* to the accelerator operation amount PA may be expressed by dead time and a secondary delay filter, and three variables, which are the dead time and two variables defining the secondary delay filter, may be used as variables related to the opening degree of the throttle valve. In this case, the state variable is preferably the amount of change per unit time of the accelerator operation amount PA instead of the time-series data of the accelerator operation amount PA.

In the above-described embodiments, the retardation amount aop is used as the variable related to the ignition timing, which is an action variable. However, the present disclosure is not limited to this. For example, the ignition timing, which is corrected by a KCS, may be used as the variable related to the ignition timing.

In the above-described embodiments, the variable related to the opening degree of the throttle valve and the variable related to the ignition timing are used as examples of action variables. However, the present disclosure is not limited to this. For example, when the fuel injection valve 16 is operated in correspondence with the action variable as described in the Regarding Electronic Device section below, the variable related to the opening degree of the throttle valve and the variable related to the ignition timing may be replaced by the fuel injection amount. With regard to these three variables, only the variable related to the opening degree of the throttle valve or the fuel injection amount may be used as the action variable. Alternatively, only the variable related to the ignition timing and the fuel injection amount may be used as the action variables. Only one of the three variables may be used as the action variable.

As described in the Regarding Internal Combustion Engine section below, in the case of a compression ignition internal combustion engine, a variable related to an injection amount simply needs to be used in place of the variable related to the opening degree of the throttle valve, and a variable related to the injection timing may be used in place of the variable related to the ignition timing. In addition to the variable related to the injection timing, it is preferable to use a variable related to the number of times of injection within a single combustion cycle and a variable related to the time interval between the ending point in time of one fuel injection and the starting point in time of the subsequent fuel injection for a single cylinder within a single combustion cycle.

When a rotating electric machine is subject to the operation corresponding to the action variable as described in the Regarding Electronic Device section below, the action variable simply needs to include the torque and current of the rotating electric machine. That is, a load variable, which is related to the load on the propelling force generator, is not limited to the variable or injection amount related to the opening degree of the throttle valve and may be the torque and current of the rotating electric machine.

The action variable does not have to be related to the operation of the propelling force generator. For example, when the electronic device subject to the operation corresponding to the action variable includes a transmission as described in the Regarding Electronic Device section below, the action variable may be the gear ratio of the transmission. For example, in a case in which the transmission 50 is a multi-speed transmission, the action variable may be the value of the current supplied to the solenoid valve that adjusts the engagement of the clutch using hydraulic pressure.

Regarding State

In the above-described embodiments, the time-series data of the accelerator operation amount PA includes six values that are sampled at equal intervals. However, the present disclosure is not limited to this. The time-series data of the accelerator operation amount PA may be any data that includes two or more values sampled at different sampling points in time. It is preferable to use data that includes three or more sampled values or data of which the sampling interval is constant.

The state variable related to the accelerator operation amount is not limited to the time-series data of the accelerator operation amount PA. For example, as described in the Regarding Action Variable section above, the amount of change per unit time of the accelerator operation amount PA may be used.

In the above-described embodiments, the accelerator operation amount PA is illustrated as a variable related to the command value of the load on the propelling force generator, which serves as the independent variable of the action value function defined by the manual driving defining data DR1. Instead, the variable may be the torque command value Trq*.

For example, when the current value of the solenoid valve is used as the action variable as described in the Regarding Action Variable section above, the state simply needs to include the rotation speed of the input shaft 52 of the transmission, the rotation speed of the output shaft 54, and the hydraulic pressure regulated by the solenoid valve. Also, when the torque or the output of the rotating electric machine is used as the action variable as described in the Regarding Action Variable section above, the state may include the state of charge and the temperature of the battery.

Regarding Reduction of Dimensions of Table-Type Data

The method of reducing the dimensions of table-type data is not limited to the one in the above-described embodiments. The accelerator operation amount PA rarely reaches the maximum value. Accordingly, the action value function Q does not necessarily need to be defined for the state in which the accelerator operation amount PA is greater than or equal to the specified amount, it is possible to adapt the throttle command value TA* and the like independently when the accelerator operation amount PA is greater than or equal to the specified value. The dimensions may be reduced by removing, from possible values of the action, values at which the throttle command value TA* is greater than or equal to the specified value.

Regarding Relationship Defining Data

In the above-described embodiments, the action value function Q is a table-type function. However, the present disclosure is not limited to this. For example, a function approximator may be used.

For example, instead of using the action value function Q, the policy $\pi$ may be expressed by a function approximator that uses the state s and the action a as independent variables and uses the probability that the action a will be taken as a dependent variable. Parameters defining the function approximator may be updated in accordance with the reward r. In this case, a function approximator for the manual driving mode and a function approximator for the self-driving mode may be provided. Instead, the inputs of a single function approximator may include the mode variable MV. In this case, in the manual driving mode and the self-driving mode, the variable indicating the command value of the load on the propelling force generator serving as the states is unified to, for example, the torque command value Trq*.

Regarding Operation Process

For example, when using a function approximator as the action value function Q as described in the Regarding Relationship Defining Data section above, all the groups of discrete values related to actions that are independent variables of the table-type function of the above-described embodiments simply need to be input to the action value function Q together with the state s, so as to specify the action a that maximizes the action value function Q. Based on the specified action a, the action used for the operation may be selected.

For example, when the policy $\pi$ is a function approximator that uses the state s and the action a as independent variables, and uses the probability that the action a will be taken as a dependent variable as in the Regarding Relationship Defining Data section above, the action a simply needs to be selected based on the probability indicated by the policy n.

Regarding Update Map

The $\varepsilon$-soft on-policy Monte Carlo method is executed in the process of S68 to S74 in FIG. 5. However, the present disclosure is not limited to this. For example, an off-policy Monte Carlo method may be used. Also, methods other than Monte Carlo methods may be used. For example, an off-policy TD method may be used. An on-policy TD method such as a SARSA method may be used. Alternatively, an eligibility trace method may be used as an on-policy learning.

For example, when the policy π is expressed using a function approximator, and the function approximator is directly updated based on the reward r, the update map is preferably constructed using, for example, a policy gradient method.

The present disclosure is not limited to the configuration in which only one of the action value function Q and the policy π is directly updated using the reward r. For example, the action value function Q and the policy R may be separately updated as in an actor critic method. In an actor critic method, the action value function Q and the policy π do not necessarily need to be updated. For example, in place of the action value function Q, a value function V may be updated.

The letter ε defining the policy π is not limited to a fixed value and may be changed in accordance with the rule defined in advance according to the degree of learning progress.

Regarding Reward Calculating Process

In the above-described embodiments, the reward is provided depending on whether the logical disjunction of the conditions (i) and the condition (ii) is true. However, the present disclosure is not limited to this. For example, a process that provides a reward depending on whether the condition (i) is met and a process that provides a reward depending on whether the condition (ii) is met may be executed.

For example, instead of providing the same reward without exception when the condition (i) is met, a process may be executed in which a greater reward is provided when the absolute value of the difference between the torque Trq and the torque command value Trq* is small than when the absolute value is great. Also, instead of providing the same reward without exception when the condition (i) is not met, a process may be executed in which a smaller reward is provided when the absolute value of the difference between the torque Trq and the torque command value Trq* is great than when the absolute value is small.

For example, instead of providing the same reward without exception when the condition (ii) is met, a process may be executed in which the reward is varied in accordance with the acceleration Gx. Also, instead of providing the same reward without exception when the condition (ii) is not met, a process may be executed in which the reward is varied in accordance with the acceleration Gx.

The drivability-related standard does not have to be related to the followability for the command value of a propelling force or related to acceleration. Instead, for example, the drivability-related standard may be related to at least one of vibration and noise.

The reward calculating process does not have to provide a greater reward when the standard related to drivability is met than when the standard is not met. Instead, the reward calculating process may include, for example, a process that provides a greater reward when the energy use efficiency meets a standard than when the energy use efficiency does not meet the standard and a process that provides a greater reward when the exhaust characteristic meets a standard than when the exhaust characteristic does not meet the standard.

For example, when the current value of the solenoid valve of the transmission 50 is used as the action variable as described in the Regarding Action Variable section above, the reward calculating process simply needs to include one of the three processes (a) to (c).

(a) A process that provides a greater reward when time required for the transmission to change the gear ratio is within a predetermined time than when the required time is exceeds the predetermined time.

(b) A process that provides a greater reward when the absolute value of the rate of change of the rotation speed of the input shaft 52 of the transmission is less than or equal to an input-side predetermined value than when the absolute value exceeds the input-side predetermined value.

(c) A process that provides a greater reward when the absolute value of the rate of change of the rotation speed of the output shaft 54 of the transmission is less than or equal to an output-side predetermined value than when the absolute value exceeds the output-side predetermined value.

The processes (a) to (c) provide a greater reward when the standard related to drivability is met than when the standard is not met. Specifically, the process (a) provides a greater reward when the standard related to the followability for the command value of a propelling force is met than the standard is not met, and the processes (b) and (c) provide a greater reward when the standard related to at least one of vibration and noise is met than the standard is not met.

Changing Process

When the process that provides a reward depending on whether the condition (i) of S62 in FIG. 5 is met and the process that provides a reward depending on whether the condition (ii) is met are executed as described in the Regarding Reward Calculating Process above, the changing process may be changed as follows. That is, in the self-driving mode, when the condition (i) is set such that the condition (i) cannot be met and the condition (i) is not met, 0 may be provided as a reward. This is equivalent to the non-execution of the process that provides a reward depending on whether the condition (i) is met in the self-driving mode. Accordingly, the non-execution of the process that provides a reward depending on whether the condition (i) is met in the self-driving mode is regarded as a process that changes at least one of the two processes, namely, the process that provides a reward depending on whether the condition (i) is met and the process that provides a reward depending on whether the condition (ii) is met.

Further, for example, in the manual driving mode, when the condition (ii) is set such that the condition (ii) cannot be met and the condition (ii) is not met, 0 may be provided as a reward. This is equivalent to the non-execution of the process that provides a reward depending on whether the condition (ii) is met in the manual driving mode. Accordingly, the non-execution of the process that provides a reward depending on whether the condition (ii) is met in the manual driving mode is regarded as a process that changes at least one of the two processes, namely, the process that provides a reward depending on whether the condition (i) is met and the process that provides a reward depending on whether the condition (ii) is met.

When the current value of the solenoid valve of the transmission 50 is used as the action variable as described in the Reward Calculating Process above, for example, it should be as follows. That is, in the above-described process (a), the self-driving mode is set to have a longer predetermined time than the manual driving mode. In the above-described process (b), the self-driving mode is set to have a smaller predetermined value on the input side than the manual driving mode. In the above-described process (c), the self-driving mode is set to have a smaller predetermined value on the output side than the manual driving mode. When the standard related to at least one of vibration and noise is provided as the drivability-related standard as described in the Reward Calculating Process section above, the process (b) or (c) does not have to be executed. Instead, when the intensity of vibration or noise exceeds a smaller threshold value, a smaller reward may be generally provided in the self-driving mode than in the manual driving mode.

If the torque command value Trq* generated through the execution of the ACC program 74b is a value for which the acceleration Gx of the vehicle is taken into account, on the contrary, the specified amount ΔTrq may be set to be smaller in the self-driving mode than in the manual driving mode.

When executing the process that provides a larger reward in a case where a standard related to energy use efficiency is met than in a case where the standard is not met or when executing the process that provides a larger reward in a case where the exhaust characteristics meet a predetermined standard than in a case where the exhaust characteristics do not meet the predetermined standard as described in the Reward Calculating Process section above, the changing process may be applied to these processes. Specifically, for example, in the self-driving mode, if the standard of the followability of a command value can be loosened like in the above-described embodiments, on the contrary, the standard related to energy use efficiency or the standard related to exhaust characteristics may be strict.

Regarding Electronic Device

The operated units of the internal combustion engine subject to the operation corresponding to the action variable are not limited to the throttle valve 14 or the ignition device 26. Instead, for example, the operated unit subject to the operation corresponding to the action variable may be the fuel injection valve 16. Alternatively, instead of the operated unit of the internal combustion engine, for example, the transmission 50 or the lockup clutch 42 may be used. As another option, for example, when the rotating electric machine is included as the propelling force generator as described in the Propelling Force Generator section below, a power conversion circuit such as an inverter connected to the rotating electric machine may be used. Further, instead of an on-vehicle driving system, for example, an on-vehicle air conditioner may be used. Even in this case, when, for example, the on-vehicle air conditioner is driven by the rotation power of the propelling force generator, the power of the driven wheels 60 in the power of the propelling force generator is dependent on the load torque on the on-vehicle air conditioner. Thus, including the load torque of the on-vehicle air conditioner in the action variable is effective. Even in a configuration in which the on-vehicle air conditioner does not use the power of the rotating electric machine, the on-vehicle air conditioner is affected by the energy use efficiency. Thus, including the power consumption of the on-vehicle air conditioner in the action variable is effective.

Regarding Vehicle Control System

In the processes of FIG. 10, the process of S52 is all executed in the data analysis center 130. However, the present disclosure is not limited to this. For example, the vehicle VC1 may execute the processes from S62 to S66 of FIG. 5 in the process of S52 to partially change the process of S100 in the section (b) of FIG. 10 so that the calculation result of the reward r is sent from the vehicle VC1 to the data analysis center 130.

The vehicle control system does not necessarily include the controller 70 and the data analysis center 130. For example, the vehicle control system may include a portable terminal carried by a user in place of the data analysis center 130, so that the vehicle control system includes the controller 70 and the portable terminal. Also, the vehicle control system may include the controller 70, a portable terminal, and the data analysis center 130. This vehicle control system is achieved by, for example, the portable terminal executing the process of S36 in the section (a) of FIG. 10.

Regarding Vehicle Control Data Generation Method

In the process of S36 in FIG. 4, the process that determines an action based on the action value function Q is illustrated. Instead, all the actions that are possibly taken may be selected at the same probability in, for example, a process that generates the vehicle control data prior to the shipment of the vehicle.

Regarding Execution Device

The execution device is not limited to the device that includes the CPU 72 (112, 132) and the ROM 74 (114, 134) and executes software processing. For example, at least part of the processes executed by the software in the above-described embodiments may be executed by hardware circuits dedicated to executing these processes (such as ASIC). That is, the execution device may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and a plurality of dedicated hardware circuits may be provided.

Regarding Memory Device

In the above-described embodiments, the memory device storing the relationship defining data DR and the memory device (ROM 74) storing the learning program 74c and the control program 74a are separate from each other. However, the present disclosure is not limited to this.

Regarding Internal Combustion Engine

The internal combustion engine is not limited to a spark-ignition engine, but may be a compression ignition engine that uses, for example, light oil or the like.

Regarding Propelling Force Generator

The propelling force generator mounted on the vehicle is not limited to an internal combustion engine, but may include an internal combustion engine and a rotating electric machine like a hybrid vehicle. Alternatively, for example, the propelling force generator may include only a rotating electric machine like an electric vehicle or a fuel-cell vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle control data generation method, wherein
the generation method is applied to a vehicle that allows for a self-driving mode and a manual driving mode, the self-driving mode automatically generating a command value of a propelling force produced by a propelling force generator independently of an accelerator operation, the manual driving mode generating the command value of the propelling force produced by the propelling force generator in accordance with the accelerator operation,
relationship defining data defines a relationship between a state of the vehicle and an action variable that includes a variable related to an operation of the propelling force generator,
the generation method, with the relationship defining data stored in a memory device, comprises:
  obtaining, by an execution device, the state of the vehicle that is based on a detection value of a sensor;
  operating, by the execution device, the propelling force generator;
  providing, by the execution device, based on the obtained state of the vehicle, a reward that is greater when a standard of a characteristic of the vehicle is met than when the standard is not met, wherein the providing the reward includes:
    a first process that increases the reward when a standard related to followability for the command value of the propelling force is met than when the standard is not met, and
    a second process that increases the reward when a standard related to an absolute value of an acceleration of the vehicle in a front-rear direction is met than when the standard is not met; and
  updating, by the execution device, the relationship defining data by inputting to a predetermined update map the obtained state of the vehicle, a value of the action variable used to operate the propelling force generator, and the reward corresponding to the operation of the propelling force generator,
wherein:
the update map outputs the updated relationship defining data so as to increase an expected return for the reward in a case where the propelling force generator is operated in accordance with the relationship defining data, and
the providing the reward includes changing the reward that is provided when the characteristic of the vehicle is a predetermined characteristic in the self-driving mode such that the changed reward differs from the reward that is provided when the characteristic of the vehicle is the predetermined characteristic in the manual driving mode, wherein the changing the reward includes changing, so as to be advantageous in obtaining the increased reward when the absolute value of acceleration is smaller in the self-driving mode as compared with the manual driving mode, at least one of the first process or the second process.

2. The vehicle control data generation method according to claim 1, further comprising generating, by the execution device, based on the updated relationship defining data, control mapping data by associating the state of the vehicle with the value of the action variable that maximizes the expected return, wherein
the state of the vehicle is input to the control mapping data, which outputs the value of the action variable that maximizes the expected return.

3. A vehicle controller, comprising the memory device and the execution device in the vehicle control data generation method according to claim 1, wherein
the operating the electronic device includes operating, based on the relationship defining data, the propelling force generator in accordance with the value of the action variable corresponding to the state of the vehicle obtained by obtaining the state of the vehicle.

4. A vehicle control system, comprising the execution device and the memory device in the vehicle controller according to claim 3, wherein
the execution device includes a first execution device mounted on the vehicle and a second execution device that is an out-of-vehicle device,
the first execution device is configured to execute at least the obtaining the state of the vehicle and the operating the electronic device, and
the second execution device is configured to execute at least the updating the relationship defining data.

5. A vehicle controller, comprising the first execution device in the vehicle control system according to claim 4.

6. A vehicle learning device, comprising the second execution device in the vehicle control system according to claim 4.

7. A vehicle control data generation device, comprising a memory device and an execution device, wherein
the generation device is applied to a vehicle that allows for a self-driving mode and a manual driving mode, the self-driving mode automatically generating a command value of a propelling force produced by a propelling force generator independently of an accelerator operation, the manual driving mode generating the command value of the propelling force produced by the propelling force generator in accordance with the accelerator operation,
the memory device is configured to store relationship defining data that defines a relationship between a state of the vehicle and an action that includes a variable related to an operation of the propelling force generator,
the execution device, with the relationship defining data stored in the memory device, is configured to execute:
an obtaining process that obtains the state of the vehicle that is based on a detection value of a sensor;
an operation process that operates the propelling force generator;
a reward calculating process that provides, based on the state of the vehicle obtained by the obtaining process, a reward that is greater when a standard of a characteristic of the vehicle is met than when the standard is not met, wherein the providing the reward includes:
  a first process that increases the reward when a standard related to followability for the command value of the propelling force is met than when the standard is not met, and
  a second process that increases the reward when a standard related to an absolute value of an acceleration of the vehicle in a front-rear direction is met than when the standard is not met; and
an update process that updates the relationship defining data by inputting to a predetermined update map the state of the vehicle obtained by the obtaining process, a value of the action variable used to operate the propelling force generator, and the reward corresponding to the operation of the propelling force generator,
wherein:
the update map outputs the updated relationship defining data so as to increase an expected return for the reward in a case where the propelling force generator is operated in accordance with the relationship defining data, and
the reward calculating process includes a changing process that changes a reward that is provided when the characteristic of the vehicle is a predetermined characteristic in the self-driving mode such that the changed reward differs from the reward that is provided when the characteristic of the vehicle is the predetermined characteristic in the manual driving mode, wherein the changing the reward includes changing, so as to be advantageous in obtaining the increased reward when the absolute value of acceleration is smaller in the self-driving mode as compared with the manual driving mode, at least one of the first process or the second process.

8. A non-transitory computer readable memory medium that stores a program causing an execution device to execute a vehicle control data generation process, wherein the generation process is applied to a vehicle that allows for a self-driving mode and a manual driving mode, the self-driving mode automatically generating a command value of a propelling force produced by a propelling force generator independently of an accelerator operation, the manual driving mode generating the command value of the propelling force produced by the propelling force generator in accordance with the accelerator operation, relationship defining data defines a relationship between a state of the vehicle and an action variable that includes a variable related to an operation of the propelling force generator, the generation process, with the relationship defining data stored in a memory device, comprises:

obtaining, by an execution device, the state of the vehicle that is based on a detection value of a sensor;

operating, by the execution device, the propelling force generator;

providing, by the execution device, based on the obtained state of the vehicle, a reward that is greater when a standard of a characteristic of the vehicle is met than when the standard is not met, wherein the providing the reward includes:

a first process that increases the reward when a standard related to followability for the command value of the propelling force is met than when the standard is not met, and a second process that increases the reward when a standard related to an absolute value of an acceleration of the vehicle in a front-rear direction is met than when the standard is not met; and updating, by the execution device, the relationship defining data by inputting to a predetermined update map the obtained state of the vehicle, a value of the action variable used to operate the propelling force generator, and the reward corresponding to the operation of the propelling force generator, wherein:

the update map outputs the updated relationship defining data so as to increase an expected return for the reward in a case where the propelling force generator is operated in accordance with the relationship defining data, and the providing the reward includes changing a reward that is provided when the characteristic of the vehicle is a predetermined characteristic in the self-driving mode such that the changed reward differs from the reward that is provided when the characteristic of the vehicle is the predetermined characteristic in the manual driving mode, wherein the changing the reward includes changing, so as to be advantageous in obtaining the increased reward when the absolute value of acceleration is smaller in the self-driving mode as compared with the manual driving mode, at least one of the first process or the second process.

* * * * *